US012604905B2

(12) United States Patent (10) Patent No.: US 12,604,905 B2
Agnew et al. (45) Date of Patent: Apr. 21, 2026

(54) SAFE PYROLYTIC EXTRACTION OF DISINFECTING AGENTS FROM OILS

(71) Applicant: Viridis BioDefense LLC, Dexter, MO (US)

(72) Inventors: Stephen Agnew, Richland, WA (US); Robert Michael Hust, Coeur d'Alene, ID (US); William Gene Ramsey, Warrenville, SC (US)

(73) Assignee: Viridis BioDefense LLC, Dexter, MO (US)

( * ) Notice: Subject to any disclaimer, the term of this patent is extended or adjusted under 35 U.S.C. 154(b) by 1190 days.

(21) Appl. No.: 17/455,526

(22) Filed: Nov. 18, 2021

(65) Prior Publication Data

US 2022/0151243 A1 May 19, 2022

Related U.S. Application Data

(60) Provisional application No. 63/115,202, filed on Nov. 18, 2020.

(51) Int. Cl.
| | |
|---|---|
| *A01N 65/00* | (2009.01) |
| *B01J 4/00* | (2006.01) |
| *B01J 6/00* | (2006.01) |
| *B01J 19/00* | (2006.01) |

(52) U.S. Cl.
CPC .............. *A01N 65/00* (2013.01); *B01J 4/001* (2013.01); *B01J 6/008* (2013.01); *B01J 19/0013* (2013.01); *B01J 19/0053* (2013.01); *B01J 2219/00051* (2013.01); *B01J 2219/00166* (2013.01)

(58) Field of Classification Search
CPC .......... A01N 1/00; A01N 61/00; A01N 65/00; B01J 4/00; B01J 4/001; B01J 6/00; B01J 6/008; B01J 19/00; B01J 19/0006; B01J 19/0013; B01J 19/0053; B01J 2219/00; B01J 2219/00049; B01J 2219/00051; B01J 2219/00164; B01J 2219/00166
See application file for complete search history.

(56) References Cited

U.S. PATENT DOCUMENTS

| | | | |
|---|---|---|---|
| 6,290,024 | B1 | 9/2001 | Ehlert |
| 7,588,646 | B2 | 9/2009 | Sherrel et al. |
| 2005/0260138 | A1 | 11/2005 | Flanigan et al. |
| 2009/0298935 | A1 | 12/2009 | Flanigan et al. |
| 2009/0321534 | A1 | 12/2009 | Flanigan et al. |

FOREIGN PATENT DOCUMENTS

WO 2006076033 A1 7/2006

OTHER PUBLICATIONS

Anderson et al, Comprehensive Analysis of Sorption Enhanced Steam Methane Reforming in a Variable Volume Membrane Reactor, Ind. Eng. Chem. Res. 2017, 56, 7, 1758-1771 (Year: 2017).*

* cited by examiner

*Primary Examiner* — Natasha E Young

(74) *Attorney, Agent, or Firm* — Armstrong Teasdale LLP

(57) ABSTRACT

Described herein are methods for producing multiple disinfecting agents from oils and reactors for producing multiple disinfecting agents from oils.

19 Claims, No Drawings

SAFE PYROLYTIC EXTRACTION OF DISINFECTING AGENTS FROM OILS

CROSS-REFERENCE TO RELATED APPLICATIONS

This application claims priority to U.S. Provisional Application No. 63/115,202 filed Nov. 18, 2020, the contents of which are incorporated herein by reference in their entirety.

FIELD OF THE DISCLOSURE

Described herein are methods for producing multiple disinfecting agents from oils and reactors for producing multiple disinfecting agents from oils.

BACKGROUND OF THE DISCLOSURE

Many natural oils have antimicrobial benefits, ranging from antibacterial to antiviral and sporicidal. It is standard industry practice to distill natural oils and extract a single chemical species that, for any particular oil, represents either the highest yield or most valuable constituent. One means of extracting desirable chemical species, particularly known antimicrobial and sporicidal chemicals, is though pyrolysis.

The present disclosure differs from these known industry practices, for example, by recognizing that antimicrobial and sporicidal oils have numerous chemical compounds that can be extracted with varying degrees of effectiveness for a particular target. The present disclosure focuses on extracting multiple, in and some cases many, active chemical species. In combination, these multiple active chemical species have a higher likelihood of disinfection given a target or multiple targets. In some embodiments, this extraction of chemical compounds occurs simultaneously, such that the compounds are immediately available for application. In some embodiments, this extraction of chemical compounds occurs subsequently, such that the compounds are produced and stored without having to individually extract and separately formulate the desired antimicrobial compounds.

Extracting multiple chemical species from an essential oil has been attempted previously; however, there are many deficiencies with prior attempts. For example, previous attempts do not lend themselves to the thermal ranges, controllability, or dwell times needed for efficient or sufficient multi-constituent chemical extraction for the production of disinfectant compounds. Further, previous mechanisms are not meant to employ raw natural oils, which can degrade the systems' ability to function over time.

Pyrolysis of oils, particularly when used for fumigation, involves a pyrolysis or ignition chamber that is in communication with a "thermal tunnel" where the ignition temperatures are comingled with air and an atomized oil source. However, this method can be dangerous. There is a high risk of ignition and post-ignition combustion. Fumigants particularly suited to these apparatuses are also dangerous; inhalation is the most dangerous and common route of exposure to fumigants. Most are highly toxic, and thus breathing even small amounts can cause serious illness or death. Exposure can occur via the eyes, mouth, or skin. For untrained operators, this risk is even more pronounced.

The present disclosure further differs from known industry practices, for example, by enhanced safety. Producing disinfecting fumigants from natural oil, particularly vegetable oils, is much safer as the constituents are far less toxic to vertebrates and insects. Producing them by adiabatic superheating within a compression chamber is even safer as well. Adiabatic superheating within a compression chamber reduces risk of ignition while increasing the production of desirable chemical species from oils.

Described herein are methods for producing multiple disinfecting agents from oils and reactors comprising compression components. The present disclosure is economically and logistically advantageous compared to previous solutions. The present disclosure enhances safety as well. Specific advantages of the present disclosure include selective extraction of disinfecting agents and increased efficacy of disinfecting agents. Additional advantages include direct application of disinfecting agents to target environments without the need for further storage or transport.

BRIEF DESCRIPTION OF THE DISCLOSURE

In one embodiment, the present disclosure is directed to a method for producing at least one disinfecting agent, the method comprising: (i) introducing an oil into a reactor, wherein the reactor comprises a reaction zone and a compression component, (ii) reacting the oil in the reaction zone of the reactor to produce at least one disinfecting agent, (iii) optionally concentrating the at least one disinfecting agent, (iv) and optionally storing the at least one disinfecting agent.

In another embodiment, the present disclosure is directed to a reactor comprising: a container comprising an oil; a power plant; a reaction zone comprising a compression component, wherein the oil reacts in the reaction zone to produce at least one disinfecting agent; and optionally a condenser.

DETAILED DESCRIPTION OF THE DISCLOSURE

The present disclosure relates generally to the production of disinfecting agents from an oil feedstock. In many embodiments, multiple disinfecting agents are produced from the oil feedstock. Typically, an oil is introduced into a reactor comprising a compression component, and the oil is reacted in a reaction zone of the reactor to produce at least two disinfecting agents. In some embodiments, the at least two disinfecting agents are concentrated and/or stored after production. The reactor typically has an oil container, a power plant, and a reaction zone, and optionally a condenser.

Disinfecting Agents

As used herein, disinfecting agent or agents refer to agents that are active against certain living and/or infectious targets.

The disinfecting agents are agents that are extracted from an oil by the methods according to the present disclosure. In some embodiments, the disinfecting agents are known in the art. In some embodiments, the disinfecting agents are newly produced by the methods according to the present disclosure. In some embodiments, the disinfecting agents are a combination of disinfecting agents known in the art and novel disinfecting agents.

The disinfecting agents typically include at least two, at least three, at least four, or at least five disinfecting agents. Numerous disinfecting agents are produced according to the present methods, and dwell times and temperatures are satisfactorily adjusted to achieve efficient and effective extractions.

In some embodiments, the disinfecting agents each individually comprise a functional group selected from the group consisting of long chain fatty acids, long chain fatty alcohols, alcohols, alcohol analogs, phenols, terpenes, terpenoids, aldehydes, carboxylic acids, cyclic ethers, esters, alkyl esters, ketones, and combinations thereof. In some embodiments, the disinfecting agents each individually comprise a functional group selected from the group consisting of long chain fatty acids, long chain fatty alcohols, alcohol analogs, phenols, terpenoids, aldehydes, ketones, and combinations thereof.

In some embodiments, the disinfecting agents comprise a disinfecting agent selected from the group consisting of acetaldehyde, butanal, benzene, pentanal, methyl furan, heptanal, hexanal, decanal, dodecanal, nonanal, butene, propenal, propanal, butylfuran, methyl-tetrahydrofuran, butyl-tetrahydrofuran, methyl propionate, acetic acid, palmitic acid, linoleic acid, linolenic acid, alpha linoleic acid, oleic acid, stearic acid, hexanoic acid, octanoic acid, lauric acid, myristic acid, palmitoleic acid, glycerin, glycerol, ethanol, and combinations thereof.

In some embodiments, the disinfecting agents demonstrate synergistic disinfection activity. In some embodiments, the disinfecting agents demonstrate specific disinfection activity for one target compared to another target.

Many of the disinfecting agents are sensitive to oxygen and decrease in effectiveness over prolonged exposure to air. Thus, for maximum efficacy, the disinfecting agents should be used soon after production or, if they are sealed after production, soon after exposure to air. In some embodiments, the disinfecting agents are used immediately after production. In some embodiments, the disinfecting agents are stored in a sealed and optionally refrigerated container under an inert atmosphere after production to limit, reduce, or prevent oxidation. Disinfecting agents produced by different methods in accordance with the present disclosure are combined and used or stored as desired.

In many embodiments, the disinfecting agents are used in a consumer product. Suitable consumer products include products that comprise the disinfecting agents and/or deliver the disinfecting agents to a surface comprising a living and/or infectious target. In some embodiments, the consumer product is a consumer product selected from the group consisting of a wipe, a spray, a fumigant, a nebulizer, a vaporizer, mister, and combinations thereof. As used herein, a fumigant means a vapor, an aerosol, a smoke, a fog, a mist, or a cloud. In some embodiments, the fumigant is visible. In some embodiments, the fumigant is invisible.

In some embodiments the liquid droplet source is persistent. In these embodiments, the persistent liquid droplet source provides measurable duration prophylactic performance.

Targets

In many embodiments, the disinfecting agents or agents according to the present disclosure are active against a variety of living and/or infectious targets. In some embodiments, the disinfecting agents or agents according to the present disclosure are active against specific living and/or infectious targets. In some embodiments, the disinfecting agents or agents possess an activity selected from the group consisting of antimicrobial, antiviral, antibacterial, sporicidal, antifungal, and combinations thereof. In some embodiments, the disinfecting agents or agents are active against microbes, viruses, bacteria, spores, fungi, biofilms, and combinations thereof.

In some embodiments, the disinfecting agents or agents are active against a target selected from the group consisting of strains of influenza virus, coronaviruses, SARS-CoV-2 (COVID-19), variants of SARS-CoV-2 (COVID-19), the lineage B.1.1.7 (alpha) variant of SARS-CoV-2, the lineage B.1.351 (beta) variant of SARS-CoV-2, the lineage P.1 (gamma) variant of SARS-CoV-2, the lineage B.1.617.2

(delta) variant of SARS-CoV-2, the lineage C.37 (lambda) variant of SARS-CoV-2, the lineage B.1.621 (mu) variant of SARS-CoV-2, West Nile virus, small pox virus, *Bacillus, Bacillus anthracis, B. lichenformis, B. megaterium, Yersinia, Yersinia pestis, Salmonella, Escherichia, Shigella, Pseudomonas, Serratia, Enterobacter, Clostridium, Clostridium botulinum, Campylobacter, Klebsiella, Mycobacterium, Staphylococcus, Bordetella, Streptococcus, Francisella, Legionella, Vibrio, Blastomyces, Candida, Stachybotrys, Aspergillus, Aspergillus candidus, Aspergillus falus, Acremonium, Histoplasma, Linea, Fusarium, Fusarium solani, Ceratocystis, Cladisporium, Penicillium, Botrytis*, and combinations thereof.

In some embodiments, the disinfecting agents or agents are active against a target selected from the group consisting of strains of *Salmonella, Staphylococcus*, and combinations thereof.

Oil Feedstock

In many embodiments, the oils are selected from any oil feedstock known in the art that is suitable to produce disinfecting agents. Known oils include human consumable vegetable oils and animal oils. Seed oils are particularly advantageous. Oils derived from wood should be avoided because they produce noxious and toxic volatiles and other compounds.

In many embodiments, the oil is a biogenic oil. In many embodiments, the oil is a plant-based or plant-derived oil. In some embodiments, the oil is selected from the group consisting of vegetable oil, alkylated vegetable oil, vegetable oil derivatives, soybean oil, linseed oil, flax oil, safflower oil, mineral oil, corn oil, olive oil, sunflower seed oil, rapeseed oil, biogenic oil, planted-derived oil, plant-based oil, herbaceous oil, waste oil, fryer oil, recycled oil, and combinations thereof.

In some embodiments, the oil is a waste oil. In some embodiments, the oil is a waste oil selected from the group consisting of waste vegetable oils, waste animal oil, waste cooking oils, waste oils from trees, waste oils from fossil fuels, and combinations thereof. Waste cooking oils are particularly useful. Waste oils from trees and fossil fuels are useful but are often more toxic and environmentally harmful than other waste oils.

In many embodiments, one or more oils are used in the methods of the present disclosure. In some embodiments, the oil comprises at least one oil selected from the group consisting of natural oils, processed oils, waste oils, and combinations thereof. In some embodiments, the oil comprises at least two oils selected from the group consisting of natural oils, processed oils, waste oils, and combinations thereof.

In many embodiments, in addition to producing disinfecting agents, the oil is used as a combustible fuel. In some embodiments, the oil is used as a combustible fuel in an engine. In some embodiments, the oil is used as a combustible fuel in an engine selected from the group consisting of jet engines, rotary engines, piston engines, and combinations thereof. In some embodiments, the oil is used via gasification or pyrolysis to produce combustible fuel. In some embodiments, the oil is treated and used as biodiesel. When used as a combustible fuel, the oil provides a source of heat and gas flow via an exhaust.

Carrier Gas

As used herein, gas refers to the gaseous state of matter and not hydrocarbon fuel sources. The gas is a carrier gas for the oil.

In many embodiments, the gas is any gas suitable for transporting the oil through the reactor. Considerations for suitable gases include flow properties, thermal properties, reaction properties, and cost. In some embodiments, the gas is selected from the group consisting of $N_2$, $CO_2$, $H_2$, $O_2$, air, steam, noble gases, helium, neon, argon, krypton, xenon, radon, and combinations thereof. In some embodiments, the gas is selected from the group consisting of air, steam, and combinations thereof.

Reactions

In many embodiments, disinfecting agents produced according to the present disclosure are produced in parallel from the oil through any suitable means of production for such compounds. The means of production are configured for optimal production of multiple disinfecting agents from the oil.

In some embodiments, disinfecting agents are produced from the oil with a technique selected from the group consisting of pyrolytic decomposition, steam distillation, catalytic decomposition, and combinations thereof. Heat-based techniques decompose the oil into one or more reactive constituents in the reaction zone. In some embodiments, these constituents further react with the same or different constituents depending on the chemical environment of the reaction zone or formation of intermediate, metastable phases.

In some embodiments, disinfecting agents are produced from the oil with a catalytic reactor selected from the group consisting of floating catalyst reactors, packed bed reactors, and combinations thereof. In these embodiments, particularly suitable catalysts include noble metals, Cu, $CuO_x$, $CaCO_3$, and non-toxic organometallic catalysts. The residence time of such catalytic reactors should be adjusted to achieve the necessary dwell times to produce multiple disinfecting agents of interest.

Atomization

In some embodiments, the oil is introduced into a flowing gas. In some embodiments, the method step of introducing an oil into the flowing gas comprises atomizing the oil. In some embodiments, the oil is atomized by any suitable method of atomization. In some embodiments, the method step of introducing an oil into the flowing gas comprises an introduction technique selected from the group consisting of spraying the oil, drawing the oil through a Venturi port or nozzle, wicking the oil, film processing, and combinations thereof.

When the atomization method comprises spraying the oil, the oil is under pressure, and the oil is sprayed through a port or nozzle designed to atomize the oil. When the atomization method comprises drawing the oil through a Venturi port or nozzle, the Venturi port or nozzle relies on suction from the gas stream to draw and atomize the oil. When the atomization method comprises wicking the oil, the wick partially or completely obstructs the gas flow and acts as a vaporizing medium, thereby drawing the oil into the gas stream.

Dwell Time

In many embodiments, the oil is in a reaction zone of the reactor for a dwell time suitable to produce at least two disinfecting agents. In some embodiments, the oil is in a reaction zone of the reactor for a dwell time suitable to produce at least one disinfecting agent. As used herein, dwell time is the time during which the oil is in a reaction zone of the reactor. Dwell times vary between disinfecting agents and the properties of the reactor, such as the gas flow rate, and are satisfactorily adjusted to optimize production of desired disinfecting agents.

In some embodiments, the dwell time is in the range of from about 0.01 seconds to about 2.5 seconds. In some embodiments, the dwell time is less than about 2 seconds. In some embodiments, the dwell time is less than about 1.5 seconds. In some embodiments, the dwell time is less than about 1 second. In some embodiments, the dwell time is less than about 0.5 seconds.

In some embodiments, particularly for film processing, the dwell time is in the range of from about 30 seconds to about 60 seconds for the portion of the oil reacted.

In many embodiments, the gas flow rate is varied to achieve desired dwell times. Specific gas flow rates depend on the reaction kinetics and desired throughput of disinfecting agents. In some embodiments, the gas flow rate is in the range of from about 500 to 4000 mL/min for each nominal mL of oil fed.

Temperature

In some embodiments, various components of the reactor are heated. In some embodiments, all components of the reactor are heated. In some embodiments, various components of the reactor are unheated. In some embodiments, all components of the reactor are unheated. Any suitable heating element known in the art (e.g. Nichrome, steel, Inconel, molybdenum disilicide, silicon carbide, etc.) is useful to provide heating.

In many embodiments, the reactor is under adiabatic conditions. In some embodiments, the temperature is less than the target temperature for pyrolytic vaporization or volatilization of the oil but greater than the temperature of pyrolysis or volatilization. In some embodiments, a temperature of the reaction zone is less than an optimal target temperature for pyrolytic vaporization or volatilization of the oil but greater than the minimum temperature of pyrolysis or volatilization of the oil. In some embodiments, heated air is constantly supplied to the reactor.

In some embodiments, when the reaction zone is unheated, it is operated at ambient temperature. In some embodiments, when the reaction zone is unheated, it is operated at a temperature in the range of from about 10° C. to about 40° C. In some embodiments, when the reaction zone is heated, it is operated at a temperature in the range of from about 70° C. to about 1000° C. In some embodiments, when the reaction zone is heated, it is operated at a temperature in the range of from about 85° C. to about 750° C.

In some embodiments, the reaction zone is operated at a temperature in the range of from about 200° C. to about 800° C. In some embodiments, the reaction zone is operated at a temperature in the range of from about 300° C. to about 700° C. In some embodiments, the reaction zone is operated at a temperature in the range of from about 400° C. to about 600° C. In some embodiments, the reaction zone is operated at a temperature in the range of from about 400° C. to about 500° C.

In some particular embodiments, the reaction zone is operated at a temperature in the range of from about 400° C. to about 550° C. Within this temperature range, numerous disinfecting agents become available while avoiding the production of excess solid particles, excess fine particles, and combustion.

In some embodiments, the gas is preheated via an external source prior to the method step of flowing a gas through a reactor. In some embodiments, one or more components of the reactor are temperature controlled. In some embodiments, the gas is preheated via an external source and then introduced, along with the atomized oil, into a reaction zone. By preheating the gas and/or heating components of the reactor, natural cooling of the gas is mitigated and dwell times are better managed. Further, heating and preheating provide greater control over reactions, which is especially advantageous when multiple desired disinfecting agents require varying temperatures and dwell times.

Reactor Components

In many embodiments, the reactor comprises several components in a variety of arrangements and orientations to produce multiple disinfecting agents. These components include, but are not limited to, the components described herein.

Reaction Zone

The reactor comprises a reaction zone. In some embodiments, the reaction zone is heated. In some embodiments, the reaction zone is unheated.

In many embodiments, the reaction zone comprises a compression component. In some embodiments, the compression component is a compression cylinder. In many embodiments, the reactions in the reaction zone occur under adiabatic conditions.

In some embodiments, the compression component comprises a head, cylinder housing, block, and/or piston. In some embodiments, the compression component comprises a combustion engine. In some embodiments, the compression component comprises a diesel engine.

In some embodiments, the compression component comprises a modified combustion engine. In some embodiments, the compression component comprises a combustion engine modified to eliminate combustion in one or more cylinders. In some embodiments, the compression component comprises a combustion engine modified to pyrolyze oil in one or more cylinders.

In many embodiments, a combustion engine is particularly beneficial because unmodified cylinders power the mechanism using oil pyrolyzed in modified cylinders.

In some embodiments, the compression component is coupled to the chassis or housing with a mechanical coupler. In some embodiments, the compression component is coupled to an armature or controller to allow an element of the compression component (e.g. a piston) to be moved back and forth within the compression component under force.

In some embodiments, the armature is coupled to a motor or engine. In some embodiments, the armature is coupled to a motor or engine, wherein the motor or engine are the same power supply or engine that preheats air for the system.

In some embodiments, the oil reacts in the reaction zone to produce at least one disinfecting agent. In some embodiments, the oil reacts in the reaction zone to produce at least two disinfecting agents.

In some embodiments, the reaction zone comprises a first end comprising a fluid input and a second end comprising a fluid output. In some embodiments, the reaction zone comprises additional fluid outputs, which are located anywhere along its length. These additional fluid outputs are particularly beneficial for the specific extraction of disinfecting agents. In some embodiments, each fluid input is individually configured to allow passage of a gas flow comprising an oil. In some embodiments, each fluid output is individually configured to allow passage of a gas flow comprising at least one disinfecting agents. In some embodiments, each fluid output is individually configured to allow passage of a separated gas flow comprising at least two disinfecting agents.

In some embodiments, the gas-oil mixture is introduced into a first end comprising a fluid input of the reaction zone. In some embodiments, one or more condensers are mechanically connected to a second end comprising a fluid output of the reaction zone to extract and concentrate the disinfecting agents. In some embodiments, one or more condensers are fluidically connected to a second end comprising a fluid output of the reaction zone to extract and concentrate the disinfecting agents. In some embodiments, one or more condensers are mechanically and fluidically connected to a second end comprising a fluid output of the reaction zone to extract and concentrate the disinfecting agents.

In some embodiments, the reaction zone comprises a cowling. In some embodiments, gas flow passes through the cowling to increase the number and volume of disinfecting agents capable of being produced.

In some embodiments, the reaction zone comprises a passage element selected from the group consisting of a conduit, a tube, a tunnel, a pipe, a hose, and combinations thereof.

The reaction zone through which gas flows, including exhaust from combustion when present, is generally of sufficient size such that exhaust residue does not hinder the production of disinfecting agents. The size of the reaction zone is large enough to allow significant throughput of disinfecting agents yet small enough to avoid altering the fluid dynamics of the reactor. In some embodiments, the width or diameter of the reaction zone is in the range of from about $\frac{1}{8}$ inches to about 3 inches. In some embodiments, the width or diameter of the reaction zone is in the range of from about $\frac{1}{2}$ inches to about 3 inches.

In some embodiments, the reaction zone through which gas flows, including exhaust from combustion when present, comprises a material that inhibits buildup of exhaust residue. Any suitable material known to inhibit buildup of exhaust residue is useful. Specifically useful materials include Al/80Ni20Cr alloy, HVOF-sprayed NiCrSiB alloy, 310S type stainless steels, high-Cr Mo—Ni base alloys, and high Si—Cr—Ni—Fe alloys.

Frame

In some embodiments, the reactor comprises a frame that is selected from the group consisting of a chassis, a housing, and combinations thereof. As used herein, a chassis is a mechanical framework that provides structural integrity and holds the other components in place. As used herein, a housing is a mechanical framework that provides structural integrity and holds the other components in place, and also covers components and protects them from wear and damage over the course of use.

Oil Container

In some embodiments, a container for the oil feedstock is coupled to the chassis or housing with a mechanical coupler. In some embodiments, a container for the oil feedstock is connected, along with an air chamber and in turn, to a compression component comprising a head, cylinder housing, block, and/or piston.

In some embodiments, the container is open, closed, or sealed. The size of the container depends on the desired throughput. In some embodiments, the coupling is permanent, semi-permanent, or temporary. Suitable mechanical couplers include grommets, hooks, buttons, snaps, clips, clamps, and bolts.

Gas and Fluid Pumps

In some embodiments, a gas pump is fluidically connected to both the oil container and reaction zone via a fluidic coupling. In some embodiments, a gas pump is fluidically connected to both the oil container and reaction zone via a fluidic coupling selected from the group consisting of a tube, a pipe, a cylinder, and combinations thereof. In some embodiments, the gas pump is an air pump.

In some embodiments, a fluidic pump is used to transmit the oil mixture into and through the reaction zone. In some embodiments, the fluidic pump is selected from the group consisting of peristaltic pumps, positive displacement pumps, syringe pumps, and cylinder pumps.

Power Plant

In some embodiments, a power plant is mechanically coupled to the chassis or housing with a mechanical coupler. The power plant drives gas flow and heat, along with a gas-oil mixture into the reaction zone (i.e. the compression cylinder). In some embodiments, the power plant is a power plant selected from the group consisting of electrical power plants, combustion engine power plants, and combinations thereof.

In some embodiments, the electrical power plant is in a form selected from the group consisting of an electric motor, and combinations thereof.

In some embodiments, the electrical power plant comprises a heat source selected from the group consisting of an induction coil, a plasma mechanism, and combinations thereof. In some embodiments, the heat source drives a component selected from the group consisting of a gas pump, a fan, a jet, and combinations thereof. In some embodiments, the electrical power plant comprises an induction coil that is mechanically coupled to the reaction zone.

In some embodiments, the electrical power plant comprises a distal element. In some embodiments, the electrical power plant comprises a distal element selected from the group consisting of a gas pump, a heating element, and combinations thereof. In some embodiments, the electrical power plant comprises a distal element that is mechanically coupled to the chassis or housing.

In some embodiments, the electrical power plant comprises a heating chamber comprising a heat source. In some embodiments, the electrical power plant comprises a heating chamber comprising a heat source, wherein a gas is heated in the heating chamber before an oil mixture is introduced to the gas. In some embodiments, the electrical power plant comprises a heating chamber comprising a heat source, wherein a gas is heated in the heating chamber before the gas enters the reaction zone.

Combustion engine power plants are useful in a variety of design variations. In some embodiments, the engine is used to drive an alternator or generator to provide heat and gas flow via the combustion exhaust. In some embodiments, the engine is used to drive an alternator or generator to provide a gas pump and auxiliary heating via plasma or a coil while also providing heat and gas flow via the combustion exhaust. The combustion engine drives the reaction mechanism and provides at least the benefits of increased mobility and reliance on a fuel source rather than electricity. In some embodiments, the combustion engine is a diesel engine.

Condenser

In many embodiments, the reactor comprises a condenser. The condenser provides suitable cross sectional areas for reducing product temperature and allowing separation and/or continued process flow.

In some embodiments, a condenser is utilized in the reactor to concentrate produced disinfecting agents within the gas stream, after which said agents are optionally stored. Any suitable condenser known in the art is useful.

In some embodiments, the condenser operates at a temperature in the range of from about −30° C. to about 0° C. In some embodiments, the condenser operates at a temperature in the range of from about −30° C. to about −10° C.

Collection Reservoir

In many embodiments, a collection reservoir to collect the disinfecting agents is coupled to the chassis or housing with a mechanical coupler. In some embodiments, the mechanical coupling is permanent. In some embodiments, the mechanical coupling is semi-permanent. In some embodiments, the mechanical coupling is temporary. Suitable mechanical couplers include grommets, hooks, buttons, snaps, clips, clamps, and bolts, and combinations thereof. In some embodiments, the collection reservoir is fluidically connected to the reaction zone or a condenser such that the disinfecting agents are collected. In some embodiments, multiple collection reservoirs are used when the separation of disinfecting agents from other oil products is desired.

Atomizer

Any suitable atomizer known in the art is useful to atomize the oil and deliver it into the reaction zone. In some embodiments, the atomizer comprises an atomization component selected from the group consisting of a nozzle, a port, a wick, a valve, and combinations thereof.

In some embodiments, the atomizer comprises a nozzle or a port. The nozzle or port atomizes the oil and delivers it into the reaction zone. Suitable ports known in the art, such as a Venturi port, are useful.

In some embodiments, the atomizer comprises a wick. The wick acts as a vaporizing medium to draw the oil into the gas stream. The wick delivers the oil into the reaction zone.

Control System

In some embodiments, the reactor comprises a control system. The control system controls one or more components of the reactor. In some embodiments, the control system comprises a means of control selected from the group consisting of an analog means of control, a digital means of control, and combinations thereof. In some embodiments, the control system is analog or digital. In some embodiments, the control system controls a reactor element selected from the group consisting of gas flow, power, oil feedstock, temperature, pressure, and combinations thereof.

Methods of Use

In many embodiments, disinfecting agents produced according to the present disclosure may be used according to any suitable means of use for such compounds.

In some embodiments, a method of using at least one disinfecting agent comprises: (i) producing the at least one disinfecting agent; and (ii) applying the at least one disinfecting agent to a target.

In some embodiments, the target is a surface comprising a living and/or infectious target.

In some embodiments, the applying the at least one disinfecting agent to a target comprises applying the at least one disinfecting agent to a target with a consumer product comprising the at least one disinfecting agent.

In some embodiments, the consumer product is selected from the group consisting of a wipe, a spray, a fumigant, a nebulizer, a vaporizer, mister, and combinations thereof.

EXAMPLES

Without further elaboration, it is believed that one skilled in the art using the preceding description can utilize the present disclosure to its fullest extent. The following Examples are, therefore, to be construed as merely illustrative, and not limiting of the disclosure in any way whatsoever.

Example 1

The reaction method comprises one or more method steps. Some of these steps include explicit or implied sub-steps. These steps and sub-steps are not intended to be limiting.

An oil is introduced into a feeding vessel or tank. The vessel is connected by a tube to a valve chamber and cylinder head. Also connected to the cylinder head is an air intake valve. In each of these inlets, both the oil and the air valves open a hollow feeding or intake chamber. In some embodiments, within the chamber is an intake valve or diaphragm that is opened to the interior of the cylinder. Also connected to the cylinder head, but distinctly separate from the intake chamber, is an exhaust valve or diaphragm. The cylinder head separates the intake chamber from the compression cylinder. The compression cylinder houses a piston that is in extremely close communication with the cylinder wall. In a closed state, the top of the piston is near the cylinder head. As the piston pulls away from the cylinder head, a vacuum is initiated, and the intake valve or diaphragm is opened, pulling in heated air and atomized oil as the piston continues to travel away from the cylinder head. Once the piston reaches its maximum distance of travel, the intake valve seals shut and the piston begins to travel back to its closed position, compressing the atomized oil and heated air. This pressure effectively multiplies the pyrolytic effects on the atomized oil particles causing them to vaporize into a myriad of constituent chemicals. As the cylinder reaches maximum compression, the exhaust valve is opened, and the internal pressure evacuates the vaporized chemicals, from the chamber, where they are captured by various means, or immediately deployed as a fumigant.

There is no ignition within the pressure chamber, which allows a variety of materials. Typically, the cylinder head, cylinder and piston are comprised of an appropriate metals or metal alloys. In some embodiments, the cylinder head, cylinder and piston are comprised of an appropriate metals, metal alloys, and combinations thereof. In some embodiments, the cylinder head, cylinder and piston are comprised of polymers, silicon, carbon fiber, and combinations thereof. In some embodiments, the cylinder head, cylinder and piston are comprised of an appropriate metals, metal alloys, polymers, silicon, carbon fiber, and combinations thereof.

Example 2

A vessel which contains oil (e.g. a natural oil) is connected by a tube to a valve chamber and cylinder head such that oil is supplied to the cylinder as needed. Also connected to the cylinder head is a heated-air intake. In each of these inlets, both the oil and the air valves open into a hollow feeding or intake chamber. The oil intake terminates in a nozzle that, when vacuum is applied, atomizes the oil. In some embodiments, within the chamber is an intake valve or diaphragm that is opened to the interior of the cylinder. Also connected to the cylinder head, but distinctly separate from the intake chamber, is an exhaust valve or diaphragm. The cylinder head separates the intake chamber from the compression cylinder. The compression cylinder houses a piston that is in extremely close communication with the cylinder wall. In a closed state, a small chamber is created between the piston and the cylinder head. The piston is mechanized such that it is compressed and retracted as needed; this action is referred to as a cycle. As the piston is made to pull away from the cylinder head, a vacuum is initiated, and the intake valve or diaphragm is opened, pulling in heated air and atomized oil as the piston continues to travel away from the cylinder head. Once the piston reaches its maximum distance of travel, the intake valve seals shut and the piston begins to travel back to its closed position, compressing the atomized oil and heated air. This pressure effectively multiplies the pyrolytic effects on the atomized oil particles causing them to vaporize into a myriad of constituent chemicals. As the cylinder reaches maximum compression, the exhaust valve is opened, and the internal pressure evacuates the vaporized chemicals from the chamber, where they are captured by various means, or immediately deployed as a fumigant.

TABLE 1

Exemplary representation of a reactor in accordance with the present disclosure.

| Component Number | Component |
|---|---|
| 1 | Air injector |
| 2 | Oil injector |
| 3 | Pressure vessel (e.g. cylinder) |
| 4 | Piston assembly |
| 5 | Exhaust system |
| 6 | External power source |
| 7 | Optional mix sensor/controller |

TABLE 2

Exemplary representation of a method in accordance with the present disclosure.

| Step Number | Step |
|---|---|
| 1 | Pre-heated air and oil are introduced into a pressure vessel/cylinder |
| 2 | Power from an external supply actuates the piston |
| 3 | Oil decomposes to vapors under pressure and increased heat and are then expelled into the exhaust |
| 4 | Antimicrobial constituents are condensed and collected. |
| 5 | A condenser specifically separates desired disinfecting agents from the product mixture |
| 6 | The desired disinfecting agents are collected to a reservoir |
| 7 | In the alternative to steps 5-6, the resulting vapors from step 4 are immediately used as a fumigant at the site of production |

This written description uses examples to illustrate the present disclosure, including the best mode, and also to enable any person skilled in the art to practice the disclosure, including making and using any compositions or systems and performing any incorporated methods. The patentable scope of the disclosure is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

As used herein, the terms "comprises," "comprising," "includes," "including," "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition or method that includes materials, steps, features, components, or elements, in addition to those literally disclosed, provided that these additional materials, steps, features, components, or elements do not materially affect the basic and novel characteristic(s) of the claimed disclosure. The term "consisting essentially of" occupies a middle ground between "comprising" and "consisting of".

Where a disclosure or a portion thereof is defined with an open-ended term such as "comprising," it should be readily understood that (unless otherwise stated) the description should be interpreted to also describe such a disclosure using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the disclosure are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

What is claimed is:

1. A method for producing at least two disinfecting agents, the method comprising:

introducing an oil into a reactor, wherein the reactor comprises a reaction zone comprising a compression component;

reacting the oil in the reaction zone of the reactor to produce at least two disinfecting agents;

optionally concentrating the at least two disinfecting agents; and optionally storing the at least two disinfecting agents.

2. The method of claim 1, wherein the reactor is a modified combustion engine.

3. The method of claim 1, wherein introducing the oil into the reactor comprises atomizing the oil.

4. The method of claim 1, wherein reacting the oil in the reaction zone of the reactor to produce at least two disinfecting agents comprises reacting the oil in the reaction zone of the reactor for a time in the range of from about 0.01 seconds to about 2.5 seconds.

5. The method of claim 1, wherein reacting the oil in the reaction zone of the reactor to produce at least two disinfecting agents comprises reacting the oil in the reaction zone of the reactor under adiabatic conditions.

6. The method of claim 1, wherein a temperature of the reaction zone is less than an optimal target temperature for pyrolytic vaporization or volatilization of the oil but greater than the minimum temperature of pyrolysis or volatilization of the oil.

7. A method of using at least two disinfecting agents, the method comprising:

producing the at least two disinfecting agents according to the method of claim 1; and applying the at least two disinfecting agents to a target.

8. The method of claim 7, wherein the target is a surface comprising a living and/or infectious target.

9. The method of claim 7, wherein the applying the at least two disinfecting agents to a target comprises applying the at least two disinfecting agents to a target with a consumer product comprising the at least two disinfecting agents.

10. The method of claim 9, wherein the consumer product is selected from the group consisting of a wipe, a spray, a fumigant, a nebulizer, a vaporizer, mister, and combinations thereof.

11. A reactor comprising:

a container comprising an oil;

a power plant;

a reaction zone comprising a compression component:

wherein the oil reacts in the reaction zone to produce at least two disinfecting agents; and optionally a condenser.

12. The reactor of claim 11, wherein the reactor further comprises a chassis or a housing.

13. The reactor of claim 11, wherein the reactor is a modified combustion engine.

14. The reactor of claim 11, wherein the reactor is configured to be operated under adiabatic conditions.

15. The reactor of claim 11, wherein the reactor is configured to be operated with a temperature of the reaction zone being less than an optimal target temperature for pyrolytic vaporization or volatilization of the oil but greater than a minimum temperature of pyrolysis or volatilization of the oil.

16. The reactor of claim 11, wherein the power plant introduces gas flow and heat into the reaction zone.

17. The reactor of claim 11, wherein the power plant provides a source of power for the reactor.

18. The reactor of claim 11, further comprising at least one collection reservoir.

19. The reactor of claim 11, wherein the oil reacts in the reaction zone to produce at least two disinfecting agents.

* * * * *